Jan. 17, 1961             J. A. WALKO             2,968,189
POWER STEERING HAVING AUXILIARY STEERING CONTROL
Original Filed Sept. 15, 1958             2 Sheets-Sheet 1
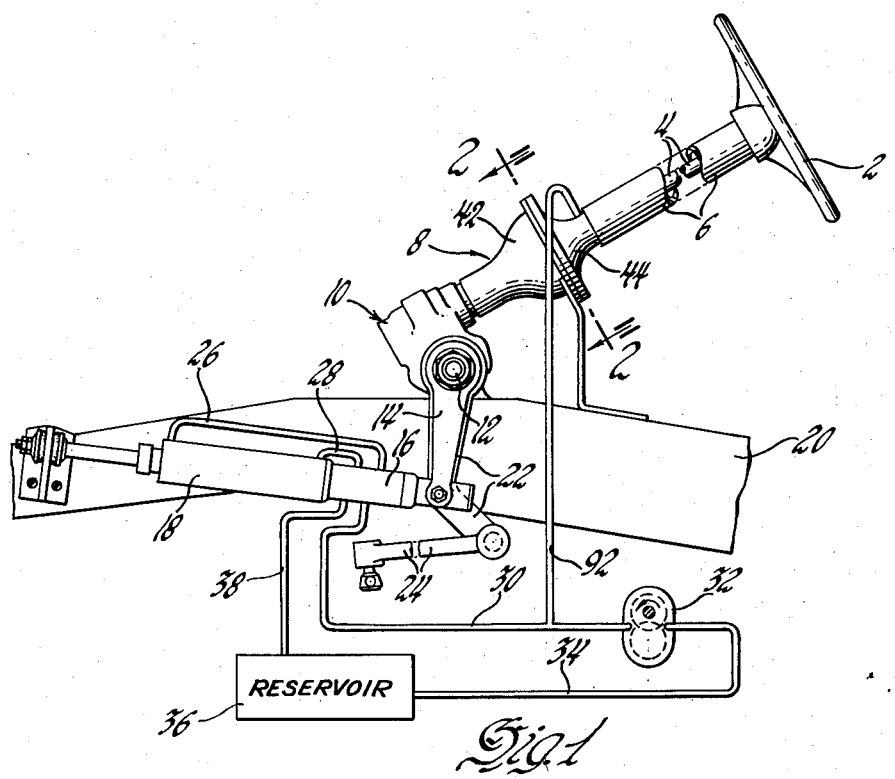
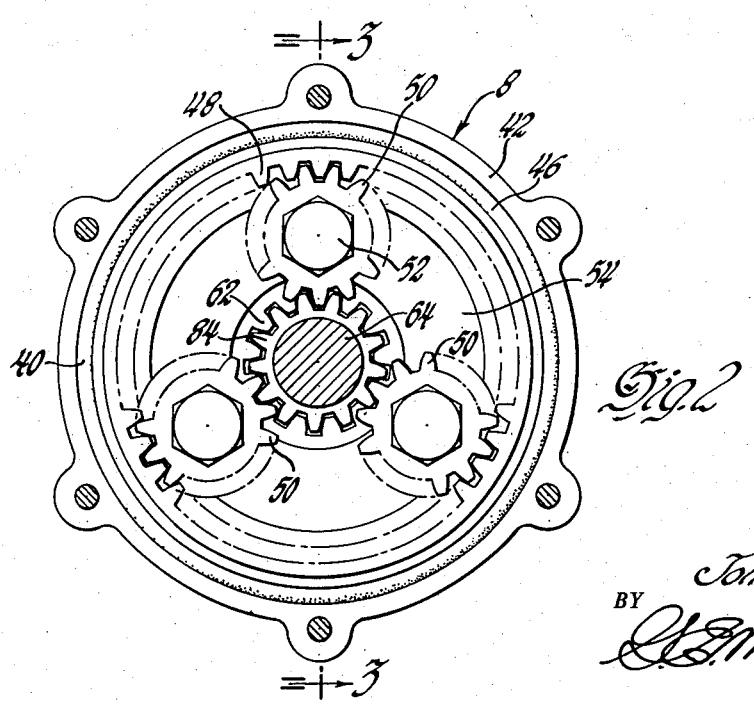
INVENTOR.
John A. Walko

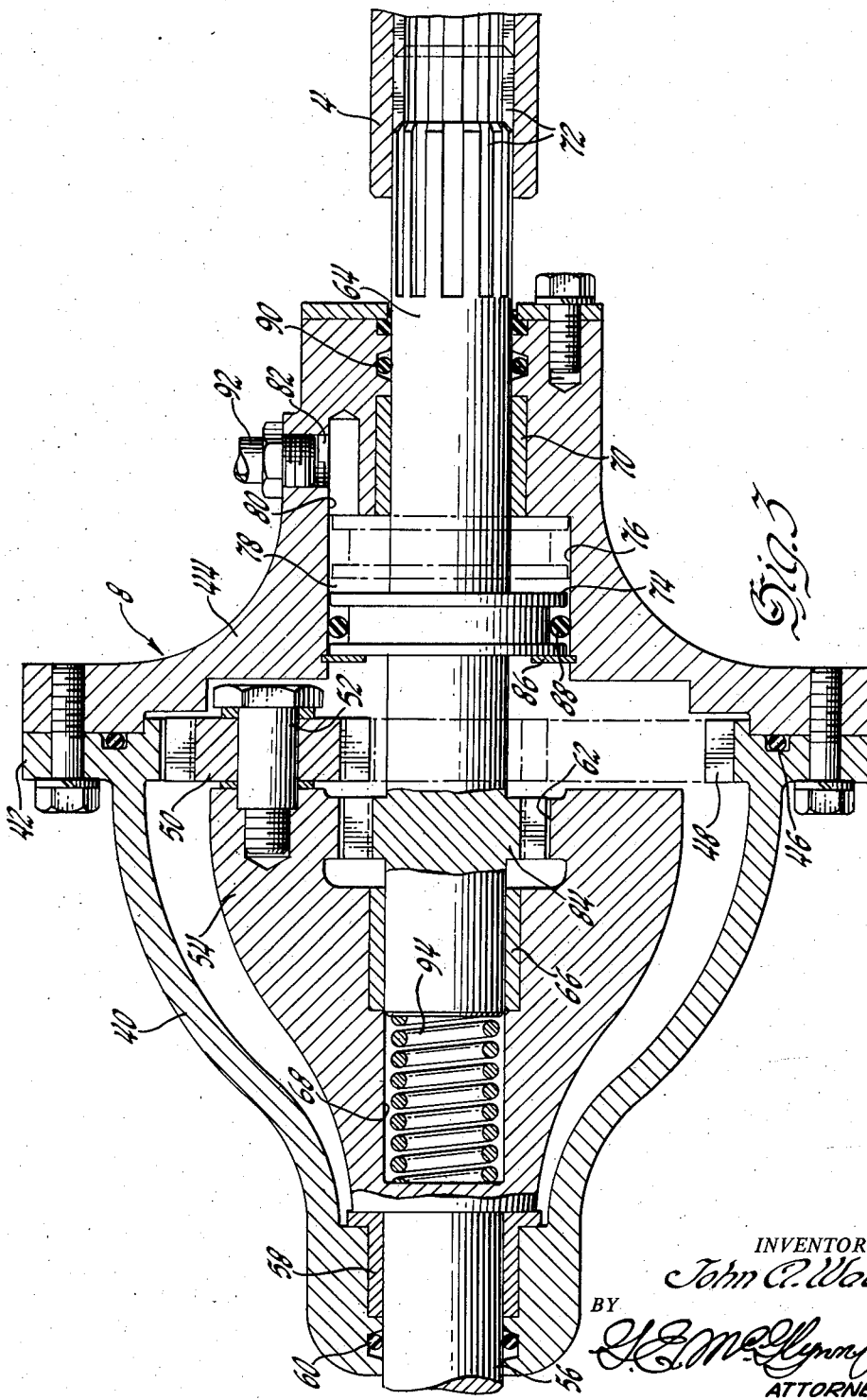

United States Patent Office 2,968,189
Patented Jan. 17, 1961

2,968,189
POWER STEERING HAVING AUXILIARY STEERING CONTROL

John A. Walko, Cleveland, Ohio, assignor to General Motors Corporation, Detroit, Mich., a corporation of Delaware Continuation of application Ser. No. 761,017, Sept. 15, 1958. This application July 13, 1959, Ser. No. 826,695

11 Claims. (Cl. 74—388)

This invention relates to a vehicle steering mechanism and, in particular, to an auxiliary manual steering mechanism or control which may be used to steer vehicles safely if the fluid power steering system with which they are equipped should fail. This application is a continuation of my application Serial No. 761,017, filed September 15, 1958, now abandoned.

In recent years there has been great public acceptance for fluid power steering systems to assist in steering vehicles. Such fluid power steering systems may take several forms among which are the integral gear type in which the power piston is directly associated with the conventional and well known sector gear to move the steering pitman arm, and the booster steering type in which the power piston of a booster steering motor is operatively connected to a drag link. Additionally, such fluid power steering systems vary in the manner in which they are brought into operation. In other words, as is well known in the art, such systems may be designed to provide full time power steering or part time power steering in which the power steering system is activated in repsonse to some predetermined steering effort. Likewise, such systems may differ in the manner in which the master control or selector valve is shifted to supply fluid to the power piston of the steering motor. Thus, in the past, it has been suggested to activate such a steering control valve by operatively connecting it to a steering shaft which is axially shiftably mounted to react to the steering effort required in steering the vehicle. On the other hand other systems, such as booster steering systems, utilize a lost motion connection between the pitman arm connected to the control valve and the steering drag link connected to the steering motor to supply the latter with power fluid upon movement of the pitman arm through the steering gear box.

Irrespective of the particular type of fluid power steering system employed, it will be readily appreciated by those skilled in the art that the manually rotatable steering shaft is connected through reduction gearing in the steering gear box to the steering gear by which the vehicle can be steered, at least theoretically, if the power steering system should fail. However, in larger vehicles, increased manual effort is required to steer the vehicle should the power steering system fail. This is particularly true with respect to heavy duty vehicles such as off-the-road earth-moving trucks. As can be imagined, in such heavy duty trucks it often happens that the vehicle operator does not possess sufficient strength to manually steer the vehicle when the power steering system fails.

Accordingly, it is a principal object and feature of this invention to provide a steering mechanism for automotive vehicles, and particularly vehicles of great bulk, which will provide one gear ratio for power steering and a reduced gear ratio providing torque multiplication for strictly manual steering.

It is yet another object and feature of this invention to provide an auxiliary steering mechanism which is adapted to conduct drive directly from a manually rotatable steering shaft to a steering gear means, but which mechanism may be shifted to provide a gear reduction and torque multiplication in the aforementioned drive which, when added to the gear reduction in the conventional steering gear means, will enable the vehicle operator to manually steer the vehicle.

It is yet another object and feature of this invention to provide an auxiliary steering or control mechanism for transmitting drive from a manually rotatable steering shaft to a steering gear means of the type which includes a fluid power steering system assisting the steering action, and which mechanism includes a gear set normally disposed in a position conducting drive directly from the aforementioned steering shaft to the steering gear means, but which mechanism will be automatically shifted to provide an underdrive or gear reduction and torque multiplication if the power steering system should fail.

In general, these and other objects and features of this invention are obtained by incorporating an auxiliary steering mechanism as an operative connection between a manually rotatable steering shaft and a more or less conventional steering gear. The auxiliary steering gear mechanism includes a driving sun gear which is axially shiftably and non-rotatably connected to the steering shaft, and a driven carrier member operatively connected to the steering gear and including spaced planet pinions rotatably mounted thereon in engagement with a fixed reaction gear. A servo motor including a piston operatively connected to the axially shiftable sun gear is normally subjected to pressure from the power steering system to maintain the sun gear in engagement with a clutch means carried by the carrier member so as to transmit drive directly through the auxiliary steering mechanism. However, if pressure should be lost in the power steering system, a yieldable spring shifts the sun gear axially into engagement with the aforementioned planet gears to conduct drive from the steering shaft to the steering gear through the planetary gear set. Consequently, a gear reduction results providing a torque multiplication enabling the vehicle operator to relatively easily manually steer the vehicle even if it should be of great bulk.

These and other objects, features and advantages of this invention will appear more fully hereinafter as the description of the invention proceeds, and in which reference is made to the following drawings in which:

Figure 1 is a fragmentary side elevation of a vehicle equipped with the invention;

Figure 2 is an enlarged section taken on line 2—2 of Figure 1; and

Figure 3 is a section taken on line 3—3 of Figure 2.

Referring now to the drawings, the invention is shown by way of illustration of a preferred embodiment thereof as incorporated into a steering mechanism utilizing a fluid power steering system of the booster type. However, in order not to obscure the invention, and in view of the fact that the specific fluid power steering system shown in and of itself forms no part of this invention and may be replaced by other types of systems within the scope of the invention, the power steering portion of the mechanism is indicated schematically.

A manually rotatable steering wheel 2 is operatively connected to the steering shaft 4 enclosed within the mast 6. The auxiliary steering mechanism 8 is connected in a manner to appear more fully hereinafter to the steering shaft 4 and the input shaft of the usual reduction gearing contained in steering gear box 10. It will be understood that the output of the reduction steering gear is taken by rock shaft 12 on which pitman arm 14 is rigidly secured. The pitman arm is operatively connected to a control valve assembly 16 associated with the booster steering motor 18 of the piston and cylinder type operatively connected to a suitable portion of the vehicle structure 20 on which the entire steering mechanism is mounted. An idler arm 22 is mounted for rotation about the shaft 12, and has its lower end suitably articulated to a drag link 24 connected by the usual linkage to the steerable vehicle wheels.

The double acting booster motor 18 is adapted to be extended and retracted by means of fluid under pressure supplied by a system including the two-way fluid flow conduits 26 and 28 communicating the opposite end of the booster motor with the control valve 16 which is supplied with fluid under pressure from the delivery conduit 30 of pump 32 connected by conduit 34 to reservoir 36. Exhaust from the booster motor is returned through valve 16 and conduit 38 to the reservoir. It will be apparent that rotation of steering shaft 4 results in movement of pitman arm 14 to move valve 16. Fluid is thereby supplied to one end of booster motor 18 which acts through idler arm 22 to assist in steering.

As indicated above, the specific structural and functional details of the power steering system illustrated are immaterial to the invention and an understanding thereof. Therefore, further description of the system is considered to be unnecessary. However, for a more complete treatment of the specific system shown by way of example, reference may be made to United States Patent 2,827,974 entitled "Power Steering Gear of the Hydraulic Type" granted to Clarence E. Frank on March 25, 1958, and assigned to the assignee of this invention.

Referring now particularly to Figures 2 and 3, the auxiliary steering mechanism 8 may be seen to include a housing consisting of a hollow main body 40 having a peripheral flange 42 to which a similar flange of cover plate member 44 may be suitably secured as by bolts. A suitable seal such as the annular O-ring 46 may be provided to maintain the interior of the housing substantially fluid and air tight.

An internal reaction gear 48 is formed on the interior wall of the housing body 40 adjacent the cover member 44, and meshingly engages a plurality of equidistantly spaced driven planet pinion gears 50 rotatably mounted on stub shafts 52 secured adjacent the periphery of a driven spider or carrier member 54. A shaft extension 56, preferably formed integral with spider 54, is rotatably supported in the sleeve bearing 58 at the lower end of the housing body 40. It will be understood that the lower extremity of the shaft extension 56 is suitably keyed or otherwise formed so as to be non-rotatably connected to the aforementioned input shaft of the gearing in box 10. A suitable seal such as the annular O-ring 60 is provided in an annular groove in the lower end of the housing body about the surface of the shaft 56. A spline or internal gear clutch means 62 is formed at the upper end of the carrier member 54 axially adjacent to but out of radial alignment with the driven planet gears 50.

A shaft 64 has its lower end rotatably supported in a sleeve bearing 66 mounted in an enlargement of a bore 68 in the carrier member 54 coaxial with the axis of rotation of the latter. The other end of the shaft 64 is similarly rotatably supported in a sleeve bearing 70 positioned in a bore in the cover plate 44, and projects outwardly from the cover plate. This upper end of the shaft is non-rotatably connected to the manually rotatable steering shaft 4 for axial shifting movement relative thereto by splines 72.

A piston 74 is formed integral with or otherwise rigidly secured to the shaft 64 intermediate the ends of the latter, and is axially slidably disposed in a cavity 76 formed in the cover plate 44. The volume enclosed by the bore 76, shaft 64 and piston 74 defines a variable volume pressure signal or servo motor chamber 78 communicating through passage 80 with the port 82 in the cover plate 44. Axially spaced from the piston 74, a driving sun gear 84 is secured to or formed integral with the shaft 64. Suitable means such as the retaining ring 86 is secured to the wall of bore 76 to limit axial movement of the piston 74 and sun gear 84 to the left in Figure 3. Additionally, suitable means such as the annular O-ring seals 88 and 90 are positioned as shown about the piston and the upper end of the shaft 64, respectively.

The port 82 is connected by the conduit 92 to the pump delivery conduit 30 thereby resulting in the fluid pressure available in the power steering system being continuously supplied to the pressure signal chamber 78. If the power system is functioning properly, this pressure acts against the piston 74 to hold the shaft 64, piston 74 and sun gear 84 in the solid line position of Figure 3 in which the sun gear meshes with the internal gear type clutch means 62 on the carrier member 54. Movement of the sun gear into this position is limited by abutment of the piston with the retaining ring 86. The aforementioned pressure signal is continuously opposed by but normally overcomes a yieldable spring 94 positioned as shown in the axial bore 68 in the carrier member, one end of the spring abutting the lower end of the shaft 64.

Referring now to the operation of the invention, a condition of normal operation may be assumed in which the fluid power steering system is functioning properly. Under such circumstances, the pressure available in the pump delivery conduit 30 is signalled through the conduit 92 to the signal or motor chamber 78 thereby urging the piston 74 and sun gear 84 to the solid line position of Figure 3. As a result, the spring 94 is compressed, and drive is transmitted directly from the manually rotatable steering shaft 4 through the sun gear 84, clutch means 62 and shaft 56 to the conventional gearing in box 10. However, should pump pressure be lost, this condition is signalled to the chamber 78. Such loss of pressure results in the spring 94 shifting the shaft 64 to the right in Figure 3 which is permitted by the splined connection 72. A a result, the piston 74 and sun gear 84 are moved to the dotted line positions of Figure 3 in which the piston abuts the cover plate to dispose the sun gear in engagement with the driven planet pinions 50. As will be apparent to those skilled in the art, the normal direct drive through the auxiliary steering mechanism is now replaced by a gear reduction resulting, either alone or in combination with the gearing in box 10, in sufficient torque multiplication to enable the vehicle to be steered entirely manually through rotation of the steering shaft 4.

Needless to say, the respective gears of the planetary gearing herein disclosed may be suitably selected to provide a desired and favorable gear reduction for the purpose aforementioned. It should also be apparent that the same result may be achieved by other arrangements of the planetary gearing. Perhaps the most obvious alternative arrangement is to conduct drive from the rotatable steering shaft 4 to the ring gear 48, while utilizing the sun gear 84 as the fixed reaction member. Another modification which will be obvious would be to dispose the internal gear, planet pinions and sun gear so as to be in continuous meshing engagement. In such a construction, a clutch could be utilized to selectively lock the planetary units together thereby resulting in direct drive as will be obvious, or which clutch could be released to provide the gear reduction. If such an expedient were to be employed, the signal pressure in the conduit 92 would then be used to actuate the clutch-applying servo motor.

Having disclosed a preferred embodiment for the purpose of illustration, it is to be understood that the invention is not to be limited thereby but only by the claims which follow.

I claim:

1. The combination with a rotatable steering shaft, steering gear means, and a fluid power steering system including a source of fluid under pressure, of an auxiliary steering mechanism forming an operative drive connection between said steering shaft and said steering gear means; said steering mechanism comprising shiftable driving gear means, reaction gear means, a driven member including driven gear means continuously meshing with said reaction gear means, clutch means on said driven member, said driving gear means having a first position in engagement with said clutch means to transmit direct drive to said driven member and a second shifted position in engagement with said driven gear means to transmit reduced drive to said driven member, fluid motor means operatively connected to said driving gear means and communicating with said source to maintain said driving gear means in said first position, and yieldable means opposing said fluid motor means and continuously urging said driving gear means toward said second position.

2. In combination with a rotatable steering shaft and a steering gear means, an auxiliary steering mechanism forming an operative drive connection between said steering shaft and said steering gear means; said steering mechanism comprising a planetary gear set including driving, reaction and driven gear means, said driving gear means being non-rotatably operatively connected to said steering shaft for relative axial movement therebetween, a driven carrier member operatively secured to said steering gear means and supporting said driven gear means, clutch means on said carrier member, said driving gear means having a first position in engagement with said clutch means to transmit direct drive from said steering shaft to said steering gear means, and a second position in engagement with said driven gear means to transmit reduced drive from said steering shaft to said steering gear means, fluid pressure force-applying means normally acting on said driving gear means to maintain the latter in said first position, and yieldable spring means opposing said force-applying means continuously to urge said driving gear means toward said second position.

3. In combination, a rotatable steering shaft, steering gear means, a fluid power steering system including a source of fluid under pressure, and an auxiliary manual steering mechanism forming an operative drive connection between said steering shaft and said steering gear means; said steering mechanism comprising a planetary gear set including driving, reaction and driven gear means, a carrier member operatively connected to said steering gear means and supporting said driven gear means, clutch means on said carrier member, said driving gear means being non-rotatably operatively connected to said steering shaft for relative axial movement therebetween, said driving gear means having first position in engagement with said clutch means to transmit direct drive from said steering shaft to said steering gear means, and a second shifted position in engagement with said driven gear means to transmit reduced drive from said steering shaft to said steering gear means, a pressure signal chamber including motor means operatively connected to said driving gear means, conduit means communicating said source of fluid pressure to said signal chamber to maintain said driving gear means in said first position, and a yieldable spring means opposing the pressure fluid in said signal chamber continuously to urge said driving gear means toward said second position.

4. The combination of an auxiliary manual steering mechanism with a fluid power steering system of the type comprising a manually rotatable steering shaft, and steering gear means including a fluid pressure operated steering motor communicating with a source of fluid under pressure; said auxiliary steering mechanism comprising a driving gear means operatively axially shiftably connected to said steering shaft, reaction gear means rotatably fixed relative to said driving gear, a driven carrier member operatively connected to said steering gear means, driven gear means rotatably mounted on said carrier member and continuously engaging said reaction gear means, clutch means on said carrier member axially of said driven gear means and out of radial alignment with said driven gear means, servo-motor means operatively connected to said driving gear to shift the latter axially of said steering shaft between a first position in engagement with said clutch means for transmitting direct drive from said steering shaft to said steering gear means, and a second position in engagement with said driven gear means to transmit reduced drive from said steering shaft to said steering gear means, a fluid connection communicating said source of fluid pressure to said servo-motor means to urge said driving gear means to said first position, and yieldable means opposing said servo-motor means and continuously urging said driving gear means to said second position.

5. The combination of an auxiliary manual steering mechanism with a fluid power steering system of the type comprising a manually rotatable steering shaft, and steering gear means including a fluid pressure operated steering motor communicating with a source of fluid under pressure; said auxiliary steering mechanism comprising a fixed housing including reaction internal gear means therein, a pressure signal chamber in said housing, a driving member including a driving shaft extending out of said housing through said pressure signal chamber and axially shiftably non-rotatably connected to said steering shaft, piston means secured to said driving shaft and axially slidably disposed in said pressure signal chamber, a driving gear axially spaced from said piston means and secured to said driving shaft within said housing, a driven carrier member in said housing including a driven shaft extending out of said housing and operatively connected to said steering gear means, a plurality of spaced driven gears rotatably supported on said carrier member and meshing with said reaction gear means, clutch means on said carrier member axially of said driving gear and out of radial alignment with said driven gears, a fluid connection communicating said source of fluid pressure to said pressure signal chamber to urge said driving gear to a first position in engagement with said clutch means to transmit direct drive from said steering shaft to said steering gear means, and yieldable means opposing the pressure in said signal chamber to urge said driving gear to a second position in engagement with said driven gears to transmit reduced drive from said steering shaft to said steering gear means.

6. The combination of an auxiliary manual steering mechanism with a fluid power steering system of the type comprising a manually rotatable steering shaft, and steering gear means including a fluid pressure operated steering motor communicating with a source of fluid under pressure; said auxiliary steering mechanism comprising a fixed housing including reaction internal gear means formed interiorly thereof, a driven carrier member rotatably mounted in said housing and including a driven shaft extending out of said housing and operatively connected to said steering gear means, a plurality of spaced driven planet gear means rotatably supported on said driven carrier member and meshing with said reaction gear means, a bore in said driven carrier member substantially on the axis of rotation of the latter, an internal gear clutch formed at one end of said bore adjacent to and out of radial alignment with said driven planet gear means, a driving member including a driving shaft having an inner end extending through said internal gear clutch and rotatably mounted in said carrier bore, and an outer end rotatably supported in and extending out of said housing and axially shiftably non-rotatably connected to said steering shaft, a signal chamber in said housing surrounding said driving shaft, piston means secured to said driving shaft intermediate the ends of the latter and axially slidably disposed in said signal chamber, a driving sun gear axially spaced from said piston means and secured to said driving shaft within said housing, said piston being shiftable within said chamber to shift said driving sun gear axially between a first position in engagement with said clutch to transmit direct drive from said steering shaft to said steering gear means, and a second position in engagement with said driven planet gear means to transmit reduced drive from said steering shaft to said steering gear means, a fluid connection communicating said source of fluid pressure to said signal chamber to urge said driving sun gear to said first position, and yieldable spring means mounted in said carrier bore and acting on the inner end of said driving shaft to urge said driving sun gear to said second position.

7. An auxiliary steering mechanism forming an operative drive connection between a rotatable steering shaft and a steering gear means, said steering mechanism comprising first and second drive means respectively operable to conduct drive between said shaft and said steering gear means in a first ratio and a second ratio providing a different torque multiplication than said first ratio, said drive means including a driving gear fixed to said steering shaft, and means including a fluid pressure system normally maintaining one of said drive means operable to conduct drive between said shaft and said steering gear means and operable automatically upon loss of pressure in said system to select the other of said drive means to conduct drive between said shaft and said steering gear means.

8. An auxiliary steering mechanism forming an operative drive connection between a rotatable steering shaft and a steering gear means, said steering mechanism comprising first and second drive means respectively operable to conduct drive between said shaft and said steering gear means in a first ratio and a second ratio providing a different torque multiplication than said first ratio, said drive means including a driving gear fixed to said steering shaft, means including a fluid pressure system normally maintaining said first drive means operable to conduct drive between said shaft and said steering gear means, and yieldable means opposing said fluid pressure means and operable automatically upon loss of pressure in said system to select said second drive means to conduct drive between said shaft and said steering gear means.

9. The combination with a rotatable steering shaft, steering gear means, and a fluid power steering system including a source of fluid under pressure, of an auxiliary steering mechanism forming an operative drive connection between said steering shaft and said steering gear means; said steering mechanism comprising first and second drive means respectively operable to conduct drive between said shaft and said steering gear means in a first ratio and a second ratio providing greater torque multiplication than said first ratio, said drive means including a driving gear fixed to said steering shaft, and means including said fluid power steering system normally maintaining said first drive means operable to conduct drive between said shaft and said steering gear means, and operable automatically upon loss of pressure in said system to select said second drive means to conduct drive between said shaft and said steering gear means.

10. The combination with a rotatable steering shaft, steering gear means, and a fluid power steering system including a source of fluid under pressure, of an auxiliary steering mechanism forming an operative drive connection between said steering shaft and said steering gear means; said steering mechanism comprising first and second drive means respectively operable to conduct drive between said shaft and said steering gear means in a first ratio and a second ratio providing greater torque multiplication than said first ratio, said drive means including a driving gear fixed to said steering shaft, and means controlling the selection of said first and second drive means including fluid motor means communicating with said source and normally maintaining said first drive means operable to conduct drive between said shaft and said steering gear means, said fluid motor means being automatically responsive to a change in the pressure of the fluid supplied from said source to select said second drive means to conduct drive between said shaft and said steering gear means.

11. The combination with a rotatable steering shaft, steering gear means, and a fluid power steering system including a source of fluid under pressure, of an auxiliary steering mechanism forming an operative drive connection between said steering shaft and said steering gear means; said steering mechanism comprising first and second drive means respectively operable to conduct drive between said shaft and said steering gear means in a first ratio and a second ratio providing greater torque multiplication than said first ratio, said drive means including a driving gear fixed to said steering shaft, a fluid motor communicating with the pressure in said system and normally maintaining said first drive means operable to conduct drive between said shaft and said steering gear means, said fluid motor being automatically responsive to a loss of pressure in said system to permit engagement of said second drive means to conduct drive between said shaft and said steering gear means, and yieldable means opposing said fluid motor to engage said second drive means upon loss of pressure in said system.

References Cited in the file of this patent

UNITED STATES PATENTS

| | | |
|---|---|---|
| 1,425,678 | Newhouse | Aug. 15, 1922 |
| 2,796,945 | Dye et al. | June 25, 1957 |